US010523023B2

(12) United States Patent
Von Novak, III et al.

(10) Patent No.: US 10,523,023 B2
(45) Date of Patent: Dec. 31, 2019

(54) CHARGER-DEVICE PAIRING FOR RECHARGE WARNINGS

(71) Applicant: QUALCOMM Incorporated, San Diego, CA (US)

(72) Inventors: William Henry Von Novak, III, San Diego, CA (US); Sumukh Shevde, Carlsbad, CA (US); Joseph Maalouf, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/216,207

(22) Filed: Jul. 21, 2016

(65) Prior Publication Data

US 2018/0026462 A1    Jan. 25, 2018

(51) Int. Cl.
H02J 7/00 (2006.01)
H04W 76/14 (2018.01)
H04W 4/80 (2018.01)
H02J 7/02 (2016.01)
H04W 84/12 (2009.01)

(52) U.S. Cl.
CPC .......... *H02J 7/0047* (2013.01); *H02J 7/0042* (2013.01); *H02J 7/025* (2013.01); *H04W 4/80* (2018.02); *H04W 76/14* (2018.02); *H04W 84/12* (2013.01)

(58) Field of Classification Search
USPC ........................................................ 320/107
See application file for complete search history.

(56) References Cited

U.S. PATENT DOCUMENTS

| 6,342,841 B1* | 1/2002 | Stingl ................. A61H 33/005 340/606 |
| 8,447,366 B2 | 5/2013 | Ungari et al. |
| 9,071,698 B2 | 6/2015 | Inha |
| 2005/0113972 A1 | 5/2005 | Kumhyr et al. |
| 2007/0096691 A1* | 5/2007 | Duncan ................. G06F 1/263 320/114 |
| 2010/0171461 A1* | 7/2010 | Baarman ................. H02J 5/005 320/108 |

(Continued)

FOREIGN PATENT DOCUMENTS

GB       2326064 A * 12/1998 ............ H02J 7/0036

OTHER PUBLICATIONS

International Search Report and Written Opinion—PCT/US2017/035972—ISA/EPO—dated Aug. 16, 2017.

(Continued)

*Primary Examiner* — Samuel Berhanu
(74) *Attorney, Agent, or Firm* — Patterson & Sheridan, LLP

(57) ABSTRACT

Techniques for charger-device pairing for recharge warnings are described. In one or more implementations, a battery of a device is determined to require charging based on a state of charge of the battery. In response to this determination, a message is communicated via a local network from the device to a charger that was previously paired with the device. The message includes a request for the charger to generate a first alert indicating that the charger is available to charge the battery of the device. In addition, the device provides a second alert indicating that the battery of the device requires charging.

30 Claims, 5 Drawing Sheets

(56) References Cited

U.S. PATENT DOCUMENTS

| | | | |
|---|---|---|---|
| 2012/0256752 A1* | 10/2012 | Musser | H02J 7/041 |
| | | | 340/636.2 |
| 2014/0155100 A1 | 6/2014 | Baldasare et al. | |
| 2014/0191712 A1 | 7/2014 | Rea et al. | |
| 2015/0288207 A1 | 10/2015 | Walker, Jr. et al. | |
| 2016/0098770 A1 | 4/2016 | Chang et al. | |

OTHER PUBLICATIONS

Lu X., et al., "Wireless Charger Networking for Mobile Devices: Fundamentals, Standards, and Applications," arXiv:1410.8635v2 [cs.NI], Dec. 9, 2014, pp. 1-16.

* cited by examiner

CHARGER-DEVICE PAIRING FOR RECHARGE WARNINGS

TECHNICAL FIELD

This disclosure relates generally to pairing a charger (wireless or wired) with a device that needs charging. When a battery of the device reaches a certain level, then warnings are generated on both the device and the charger, allowing easy connection or placement to begin recharging the device.

BACKGROUND

As wireless devices proliferate, keeping the devices charged is increasingly important and, in some cases, tedious. Some users may have multiple devices (e.g., a smartphone, a Bluetooth® headset, a reader, a laptop, and so on) all needing to be charged, many of which use different charging standards that are incompatible with one another. Managing multiple chargers for multiple devices can be annoying to users, and can reduce the perceived usability of a device.

SUMMARY

Techniques for charger-device pairing for recharge warnings are described. In one or more implementations, a battery of a device is determined to require charging based on a state of charge of the battery. In response to this determination, a message is communicated via a local network from the device to a charger. The message includes a request for the charger to generate a first alert indicating that the charger is available to charge the battery of the device. In addition, the device provides a second alert indicating that the battery of the device requires charging. The second alert can correspond to the first alert to indicate compatibility between the device and the charger.

In an example aspect, methods and systems for providing recharge warnings for paired devices are described. A message is wirelessly received indicating that a battery of an electronic device requires charge. In implementations, the message is received via a local network by a charger device. A determination is then made as to whether the charger device is available for charging. Based on a determination that the charger device is available for charging, a reply message is transmitted to the electronic device via the local network to indicate that the message was received or that the charger device is available for charging. An alert is then generated by the charger device to notify a user that the charger device is available for charging the battery of the electronic device. The alert can correspond to a counterpart alert that is generated by the electronic device to show compatibility.

Certain aspects of the present disclosure provide a method for providing recharge warnings. The method generally includes determining that a battery of a device requires charging based on a state of charge of the battery; communicating a message via a wireless local network to a charger, the message including a request for the charger to generate a first alert indicating that the charger is available to charge the battery of the device; receiving an indication via the wireless local network that the charger is available to charge the battery of the device; and providing, by the device and in response to the indication, a second alert indicating compatibility between the device and the charger.

Certain aspects of the present disclosure provide a battery-powered electronic device. The electronic device comprises a sensor configured to determine a state of charge of a battery used to power the electronic device, a memory, and a microprocessor. The microprocessor is generally configured to execute instructions stored in the memory to implement a communication module configured to determine that the battery requires charging based on the state of charge of the battery; to wirelessly communicate, via a local network, a request to a charger device, the request requesting that the charger device provide a first alert indicating that the charger device is available to charge the battery; to receive an indication that the request was received by the charger device; and responsive to the indication, to generate a second alert indicating that the battery requires charging, the second alert corresponding to the first alert to indicate compatibility between the electronic device and the charger device.

Certain aspects of the present disclosure provide a method for providing recharge warnings. The method generally includes wirelessly receiving, via a local network and by a charger device, a message indicating that a battery of the electronic device requires charge; determining whether the charger device is available for charging; based on a determination that the charger device is available for charging, transmitting a reply message to the electronic device via the local network to indicate that the charger device is available for charging; and generating an alert to notify a user that the charger device is available for charging the battery of the electronic device, the alert being generated to correspond to a counterpart alert that is generated by the electronic device.

Certain aspects of the present disclosure provide a charger device. The charger device generally includes a receiver configured to wirelessly receive, via a local network, a request for charge from an electronic device, the request requesting that the charger device generate an alert indicating that the charger device is available to charge a battery of the electronic device; a transmitter configured to wirelessly transmit, via the local network and in response to the request being received, a message indicating that the request was received and that the charger device is available to charge the battery of the electronic device; and an alert component configured to generate the alert, the alert corresponding to a counterpart alert generated by the electronic device.

BRIEF DESCRIPTION OF DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Keeping multiple wireless devices charged is important, but can be tedious and annoying to users. A user may have several different devices that use different wireless standards each requiring a different charger, many of which are incompatible with one another. Managing multiple chargers for multiple devices can be frustrating to users, and can reduce the perceived usability of a device.

To address these problems, techniques for charger-device pairing for recharge warnings are described. For example, when a device reaches a certain low-level of charge, the device can communicate with a charger that was previously paired with the device, and both the device and the charger can provide alerts (visual and/or audio) synchronously or asynchronously. An alert from the device indicates that the device needs charging, and a corresponding alert from the charger indicates that the charger is available to charge the device. In addition, the corresponding alert from the charger assists a user in identifying or locating a compatible charger.

Figure 1:
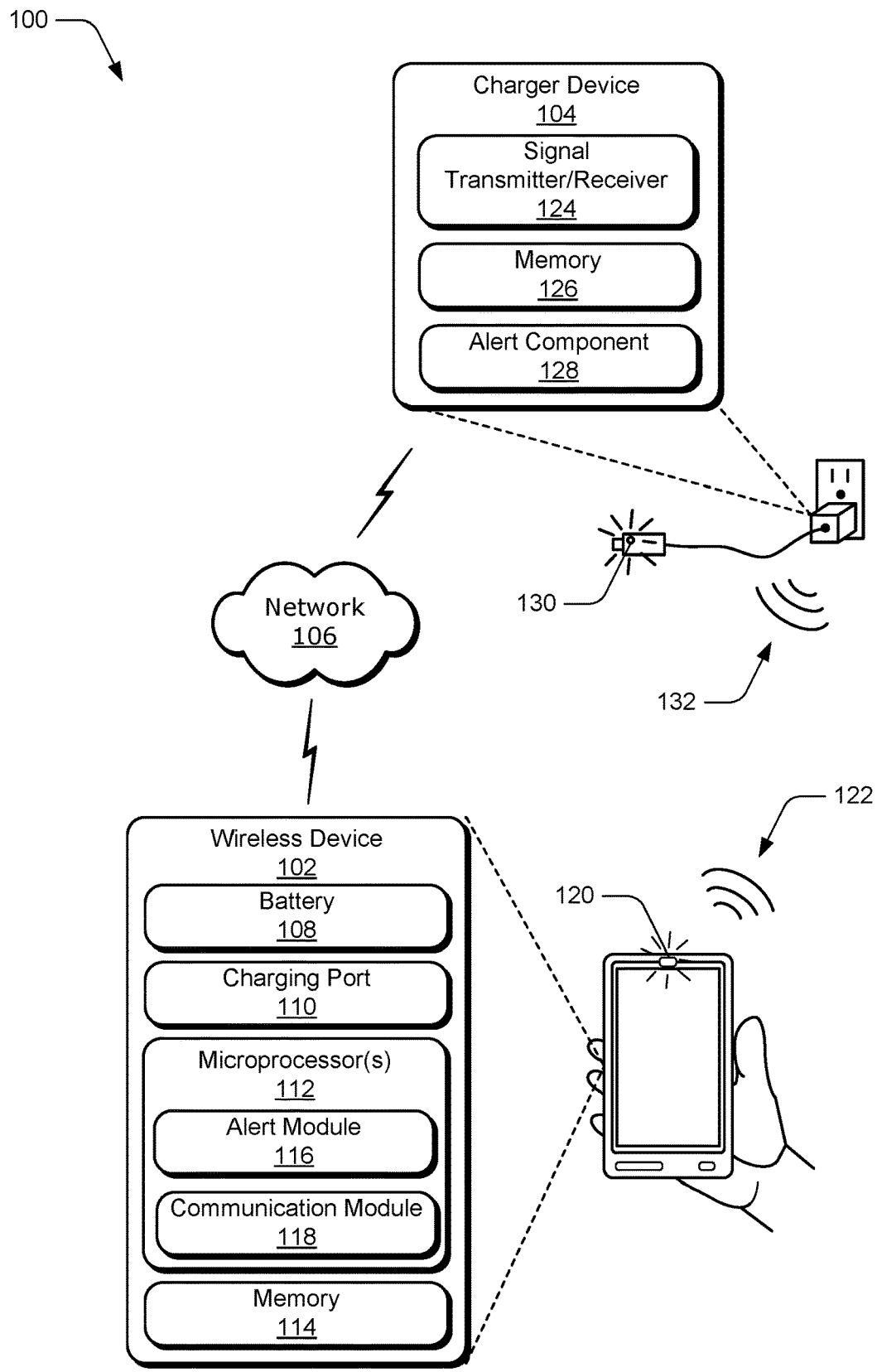
FIG. 1 illustrates an example environment in which techniques for charger-device pairing for recharge warnings can be implemented.

FIG. 1 illustrates an example environment 100 in which techniques for charger-device pairing for recharge warnings can be implemented. For example, FIG. 1 illustrates a wireless device 102 communicatively coupled to a charger device 104 via a wireless network 106. The wireless device is representative of a battery-powered electronic device having a battery 108 that is rechargeable. Electronic devices that are used to implement the wireless device 102 may be configured in a variety of ways. Electronic devices, for example, may be configured as a computing device (e.g., a laptop computer, a tablet, a smartphone, a mobile phone, a portable media player, a handheld gaming device, and so on). In addition, an electronic device may be configured as a battery-operated child's toy, a broadcast receiver (e.g., baby monitor), a two-way radio, a remote control, a wireless gaming controller, and so on.

Although the network 106 is illustrated as the Internet, the network may assume a wide variety of configurations. For example, the network 106 may include a wide area network (WAN), a local area network (LAN), a wireless network (WLAN), a wireless personal area network (WPAN) (e.g., Bluetooth®, Bluetooth® low energy (BLE), ZigBee®, and so on), a public telephone network, an intranet, and so on. Further, although a single network 106 is shown, the network 106 may be representative of multiple networks.

The wireless device 102 is illustrated as including a variety of hardware components, examples of which include a charging port 110, a microprocessor 112, and an example of a computer-readable storage medium illustrated as memory 114. The microprocessor 112 is representative of functionality to perform operations through execution of instructions stored in the memory 114. Although illustrated separately, functionality of these components may be further divided, combined, e.g., on an application specific integrated circuit), and so forth.

The charging port 110 is representative of a port via which a connection can be made with the charger device in order to receive power to charge the battery 108. The charging port 110 can include any of a variety of configurations. Examples include a Universal Serial Bus (USB) port (e.g., a charging downstream port (CDP) or a dedicated charging port (DCP)), a port for a 19 volt circular-connector, and so on. Another example includes a wireless configuration (e.g., Qi system, 6.78 MHz system, and so on). Accordingly, any of a variety of different charging ports 110 (wired or wireless) can be utilized to interface with a charging connector of a charger device.

The microprocessor 112 is illustrated as including an alert module 116 and a communication module 118. The alert module 116 is representative of functionality to transmit an alert signal indicating a low-level state of the battery 108. The alert signal can include any of a variety of signals, such as visual or auditory signals. Visual signals can include activation of a light, such as a light-emitting diode (LED) 120, in the form of a particular color or flash pattern. Audio signals, such as tone 122, can include a tone or tonal pattern, such as a ring tone or other tune.

The communication module 118 is representative of functionality to communicate with the charger device 104. In implementations, the communication module supports communication via the network 106. When the battery 108 reaches a certain low-level of charge, the communication module 118 transmits to the charger device 104 a request for the charger device 104 to alert a user that the battery 108 of the wireless device 102 needs charging and that the charger device 104 is available to provide that charge. If the charger device 104 has been previously paired with the wireless device 102, the charger device 104 can easily receive that request and respond accordingly.

The wireless device 102 and the charger device 104 can be paired via a unique ID. Once paired, any of a variety of networks (e.g., 802.11, Bluetooth®, BLE, ZigBee®, and so on) can be used to communicate the need to alert the user to charge the wireless device 102. Multiple chargers within range of a communication network being used by the wireless device 102 can each provide an alert indicating that they are available for charging the wireless device 102.

The charger device 104 is illustrated as including a signal transmitter/receiver 124 and a memory 126. The memory 126 may include short-term volatile memory and/or random access memory (RAM) to store variables. The memory 126 can be used to store pairing information (e.g., unique ID) between the charger device 104 and the wireless device 102, location information of the charger device 104, and so on. The signal transmitter/receiver 124 can transmit a message to the wireless device 102 to indicate that the request was received. Additional information can be included in that message, such as an indication that the charger device is available for charging.

The charger device 104 is available for charging if, for instance, the charger is plugged in to a power source (e.g., outlet), and is not currently charging another device or battery, such as in the case of a power adapter. The charger device 104, however, is not required to be plugged in to a power source to be available, such as in the case of a powerbank, which is a portable device that can supply USB power using stored energy in its built-in batteries. In this case, the charger device 104 is available if it is not currently charging another device or battery, and has fully charged built-in batteries.

The charger device 104 is also illustrated as including an alert component 128. In implementations, the alert component 128 can include any of a variety of mechanisms capable of generating a visual and/or audio alert for notifying a user. For instance, the alert component 128 can include a light, such as a color light-emitting diode (LED) capable of emitting different colors or flashing at different rates. Alternatively or in addition, the alert component 128 can include a speaker capable of sounding one or more tones. In at least one embodiment, the charger device 104 can notify a user that it is available to charge the wireless device 102 by generating an alert, such as a blinking light 130 or a beeping tone 132. The alert can also indicate compatibility of the charger device 104 with the wireless device 102. Further discussion of this and other aspects is provided below.

Because both the wireless device 102 and the charger device 104 generate alerts to signal the user, the user can see and/or hear both the wireless device 102 and the charger device 104 and can thus easily locate and connect the two devices (for wired chargers) or bring the two devices into proximity (for wireless chargers), or locate the charger and replace the battery (for battery or battery pack chargers). Additionally, both the wireless device 102 and the charger device 104 can generate alerts having a matching color and/or flash rate to indicate where the device and charger can be mated.

In implementations, the wireless device 102 can determine a variety of useful information. For instance, the wireless device 102 can determine the state of charge of the battery 108, a location of the wireless device 102, a location of the charger device 104, and an availability of charge. The state of charge can be determined in any suitable way. For example, a sensor, such as a battery gauge, can be used to monitor a state of charge of the battery 108. When the state of charge reaches a certain level of charge (e.g., below a predefined or user-defined threshold), the microprocessor 112 determines that the battery is low.

The location of the wireless device 102 can be determined in any suitable way. For example, the wireless device 102 can determine its position based on the local wireless network being used for wireless communications (e.g., fixed position of the network). Alternatively, the wireless device 102 can receive and use Global Positioning System (GPS) signals or accelerometers to determine its location. In implementations, the wireless device 102 can rely on a user's movement pattern to predict the location of the wireless device 102 at a given time of day. For instance, the user regularly visits the kitchen at 7:30 am, and thus the wireless device 102 can assume that its own location at 7:30 am is the kitchen.

The location of the charger device 104 can be determined using any of a variety of techniques. In implementations, when the wireless device 102 pairs with the charger device 104 or when the wireless device 102 is being charged by the charger device 104, the wireless device 102 can log its own location, which corresponds to the location of the charger device 104. Based on the assumption that charger devices do not move frequently, this location information can be stored in the memory 114 of the wireless device 102 and used to subsequently estimate the location of the charger device 104. Alternatively or in addition, a general location of the charger device 104 can be estimated if the wireless device 102 is connected via Bluetooth to the charger device 104, since a Bluetooth connection is limited to a short range (e.g., 50 meters or less).

The availability of charge can be determined in a variety of ways. For example, if the charger device 104 is unplugged, then it is likely unavailable to charge. A battery-powered charger is likely not available if it has not completed charging itself. A battery recharger is likely not available if it has not completed recharging a battery pack. If the charger device 104 is not available for charging, then the charger device 104 does not send a message to the wireless device to indicate availability, and does not generate an alert to notify the user. Instead, the charger device 104 can remain silent or non-responsive, which indicates that the charger device 104 is unavailable. Otherwise, the charger device 104 sends the availability message if it is available for charging.

Figure 2:
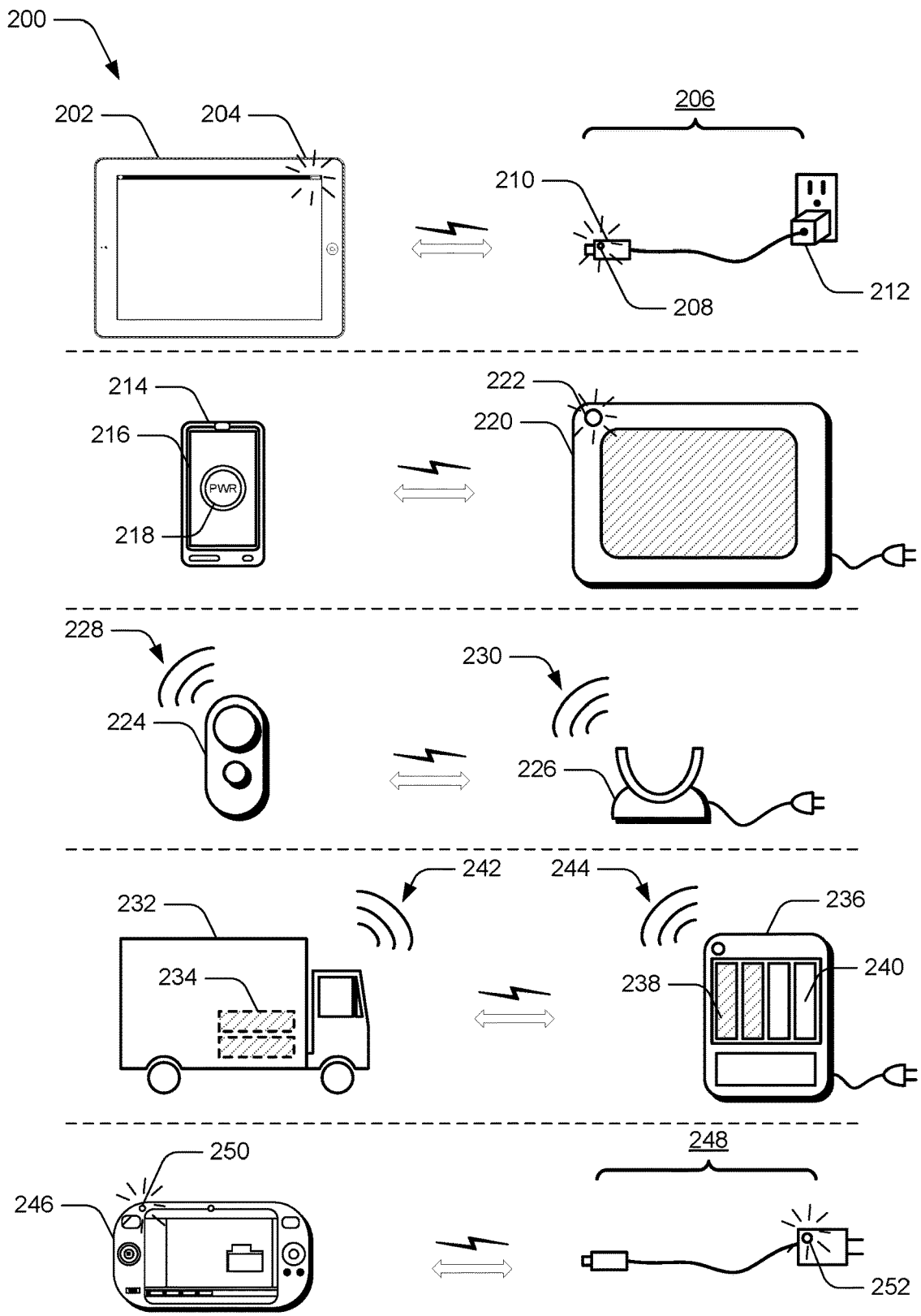
FIG. 2 illustrates example implementations that are operable to utilize techniques for of charger-device pairing for recharge warnings in accordance with one or more embodiments.

FIG. 2 illustrates example implementations 200 of charger-device pairing for recharge warnings in accordance with one or more embodiments. In at least one example, a tablet 202 may be capable of accepting a variety of different USB chargers, but a Quick Charge (QC) 3.0 standard might be better in this example to provide high power and faster charge. When the tablet 202 needs power, the tablet 202 can flash a red LED 204. Because the tablet 202 has previously been paired with QC 3.0 charger 206, the QC 3.0 charger 206 can flash a corresponding red LED 208. Here, the corresponding red LED 208 is located on a connector 210, but could instead be located on a body 212 of the QC 3.0 charger 206.

Alternatively, a mobile phone 214 includes a display device 216 configured to display a flashing blue symbol 218 indicating that the mobile phone 214 needs charging. In this example, the mobile phone 214 includes a wireless charger receiver. A nearby wireless charger 220, such as a charging pad, wirelessly receives a message that the mobile phone 214 needs charging, and then flashes a blue LED 222 indicating that the wireless charger 220 is compatible with the mobile phone 214 and is available to charge the mobile phone 214.

In yet another example, a broadcast receiver, such as a baby monitor 224, is paired with an inductive charger cradle 226. Here, the baby monitor 224 is required to be mounted on the charger cradle 226 for charging to occur. When the baby monitor 224 reaches a low state of charge, the baby monitor 224 emits a tone 228. A half second or a second later, the charger cradle 226 emits the same tone (e.g., tone 230). Alternating the tones 228 and 230, or sounding the tones 228 and 230 in an alternating pattern, can assist the user in locating both the baby monitor 224 and the charger cradle 226 since it can be challenging for users to distinguish between two simultaneous tones. In this way, the user is made aware of a device needing charge and a compatible charger device nearby.

In another example, a battery-operated toy truck 232 including rechargeable batteries 234, such as AA batteries, is paired to a battery recharger 236. When the batteries 234 of the toy truck 232 are low, and the toy truck 232 is within range of the battery recharger 236, the toy truck 232 can send a message to the battery recharger 236 to indicate that the batteries 234 are low. If the battery charger 236 includes charged batteries 238, both the toy truck 232 and the battery recharger 236 can alternately generate tones 242 and 244 (e.g., approximately one second apart), to notify the user that the rechargeable batteries 234 are low and that charged batteries 238 are available for use in the toy truck 232. If the battery recharger 236 does not have fully charged batteries 238, or only has empty slots 240, the tone 244 emitted by the battery recharger 236 can be different than the tone 242 emitted by the toy truck 232. This allows the user to easily locate the battery recharger 236 and also notifies the user that the battery recharger 236 is available to recharge the rechargeable batteries 234 but does not have fully charged replacement batteries available for use.

Yet another example includes a portable media player 246 paired with a standard USB charger 248. When the portable media player 246 reaches a relatively low level of charge, both the portable media player 246 and the standard USB charger 248 can flash green LEDs 250 and 252.

When multiple devices need charge, each paired device and charger can use a particular color that allows matching a device to a correct charger. For example, the tablet 202 and the QC 3.0 charger 206 both use red LEDs, and the mobile phone 214 and the wireless charger 220 both use the color blue, while the portable media player 246 and the standard USB charger 248 both use green LEDs.

Further, if a device is compatible with multiple chargers having different charging specifications, the chargers can use different colors to allow matching the device to a nearest compatible charger or an "ideal" charger. For example, although a device can charge through a standard USB 2.0, the device may be capable of utilizing a relatively higher power provided through a USB Quick Charge 3.0 to charge more efficiently. For instance, when the tablet 202 transmits a message requesting charge, the message is sent to all paired devices within the network. As mentioned above, the QC 3.0 charger 206 can responsively flash the red LED 208 to indicate optimal charging compatibility with the tablet 202. In addition, however, the standard USB charger 248 can flash red at a different rate than the QC 3.0 charger 206 to indicate a different degree of charging compatibility with the tablet 202. For example, the standard USB charger 248 can flash at a relatively slower rate or lower duty cycle in comparison to the QC 3.0 charger 206, indicating that the standard USB charger 248 may charge the tablet relatively slower than the QC 3.0 charger 206. Alternatively, the standard USB charger 248 can flash alternating green and red to indicate that the standard USB charger 248 supports charging the tablet 202, but not as a primary function, which is to charge lower speed devices. In this way, a degree of compatibility of the device with each respective charger is indicated based on a degree of synchronization of color or flash rate, or alternatively tonal patterns, between alerts. These implementations allow the user to find the nearest available charger as well as the ideal or optimal charger, or at least a charger with greater charging compatibility than another charger.

Figure 3:
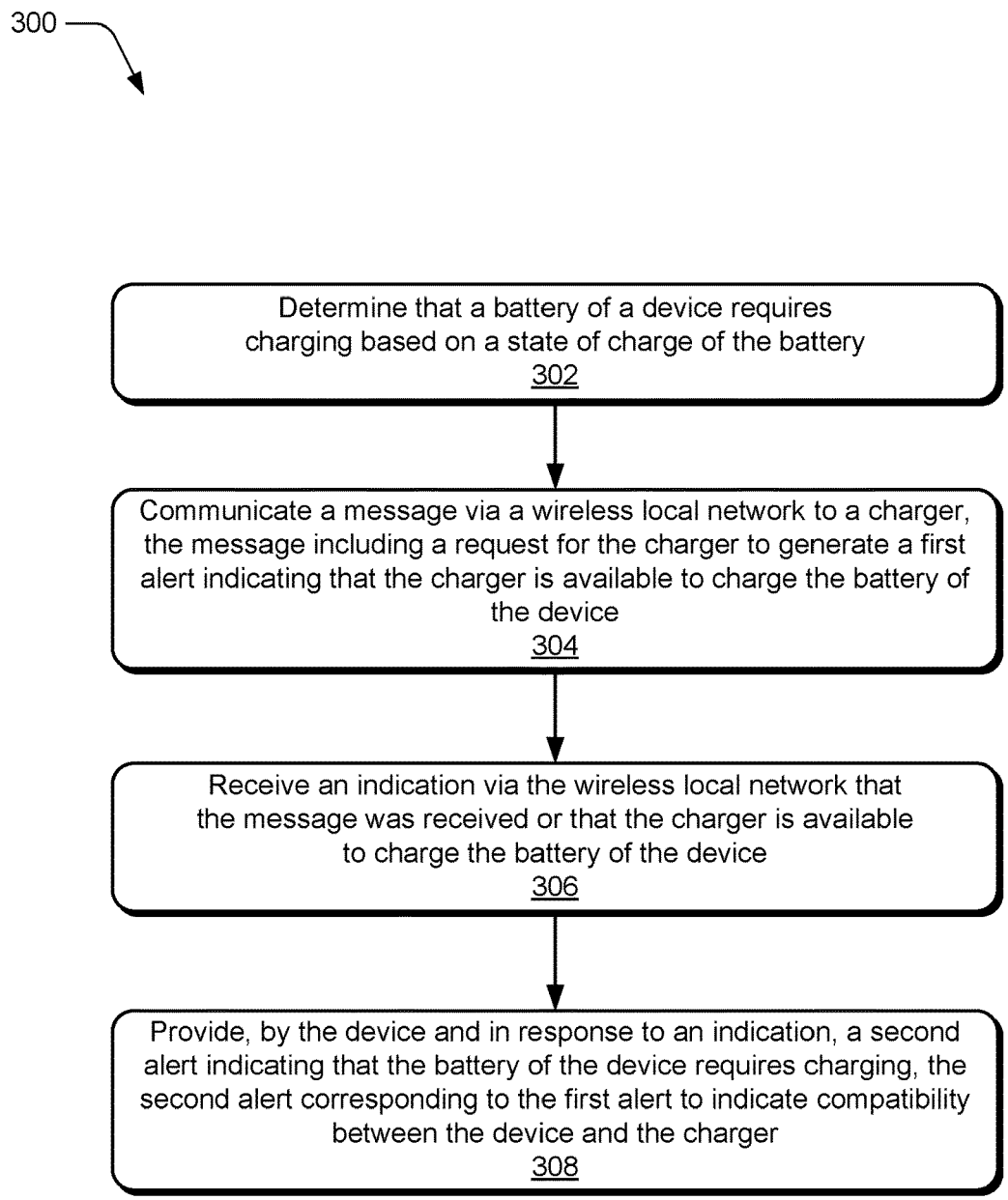
FIG. 3 depicts an example flow chart illustrating an example process for charger-device pairing for recharge warnings in accordance with one or more embodiments.

FIG. 3 depicts an example flow chart illustrating an example process for charger-device pairing for recharge warnings in accordance with one or more embodiments. A battery of a device is determined to require charging based on a state of charge of the battery (block 302). For example, the state of charge of the battery is determined to be low in comparison to a predefined or user-defined level of charge. Then, a message is communicated via a wireless local network to a charger that was previously paired with the device (block 304). In implementations, the message includes a request for the charger to generate an alert indicating that the charger is available to charge the battery of the device. An indication is received via the wireless local network that the message was received and that the charger is available to charge the battery of the device (block 306). In response to the indication that the charger is available, the device provides a separate alert indicating that the battery of the device requires charging (block 308). In implementations, the separate alert generated by the device corresponds to the alert generated by the charger to indicate compatibility between the device and the charger.

Figure 4:
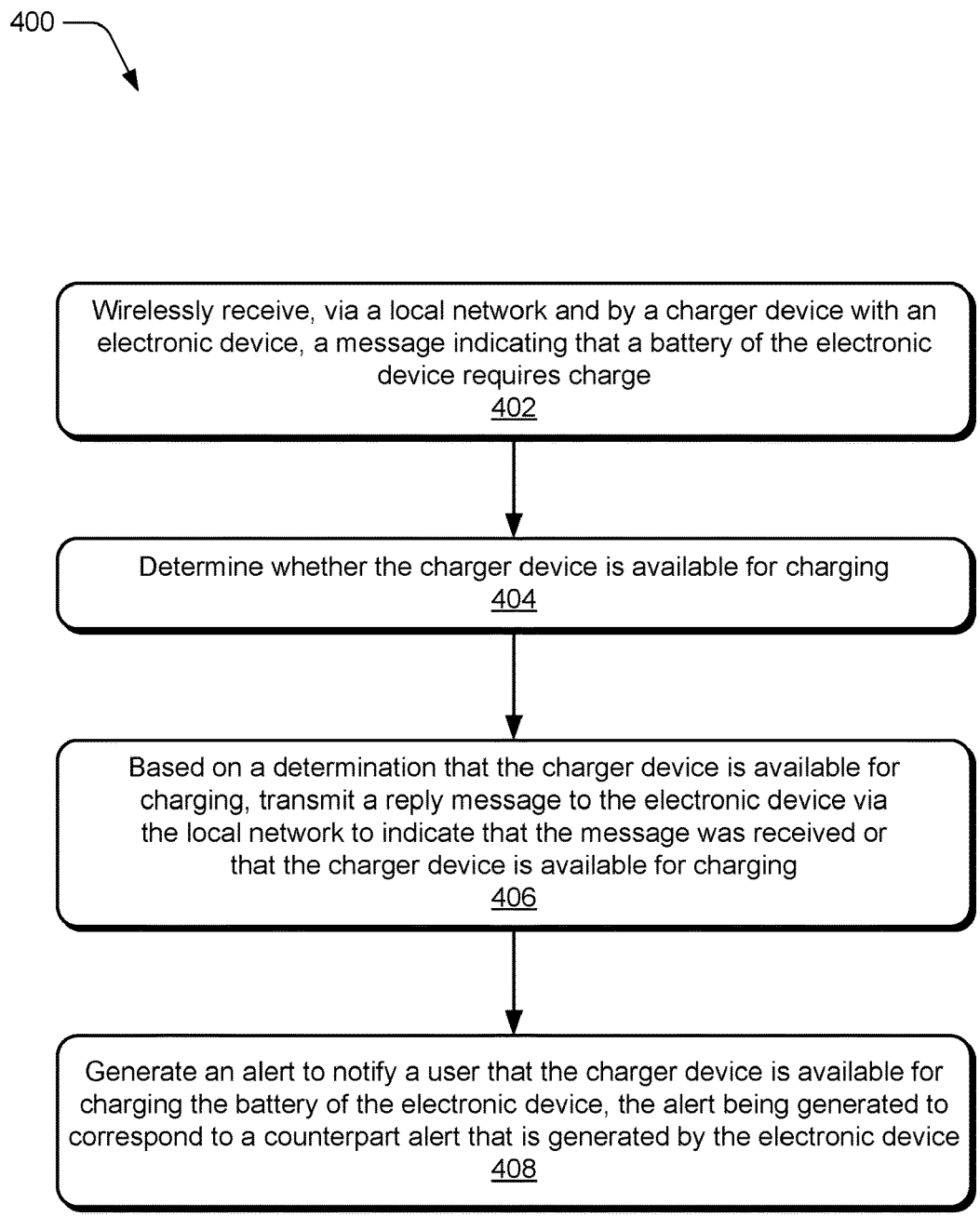
FIG. 4 depicts an example flow chart illustrating an example process for providing recharge warnings for paired devices in accordance with one or more embodiments.

FIG. 4 depicts an example flow chart illustrating an example process for providing recharge warnings for paired devices in accordance with one or more embodiments. A message, indicating that a battery of an electronic device requires charge, is wirelessly received via a local network by a charger device that was previously paired with the electronic device (block 402). A determination is made as to whether the charger device is available for charging (block 404). Based on a determination that the charger device is available for charging, a reply message is transmitted to the electronic device via the local network to indicate that the message was received and that the charger device is available for charging (block 406). Then, an alert is generated to notify a user that the charger device is available for charging the battery of the electronic device (block 408). In implementations, the alert corresponds to a counterpart alert that is generated by the electronic device. For example, the alert can include activating a color LED to match a color or rate of flashing (e.g., synchronized flash patterns) of a counterpart LED at the electronic device. Alternatively or additionally, the alert can include an audible tone that is sounded asynchronously with a counterpart tone of the counterpart alert. In at least one example, the alert can include activation of an LED to represent a non-optimal compatibility between the charger device and the electronic device. For instance, the alert can include a color that is different than a color of the counterpart alert, or the alert can flash the LED at a rate that is different (e.g., relatively slower or faster) than a flash rate of the counterpart alert.

Figure 5:
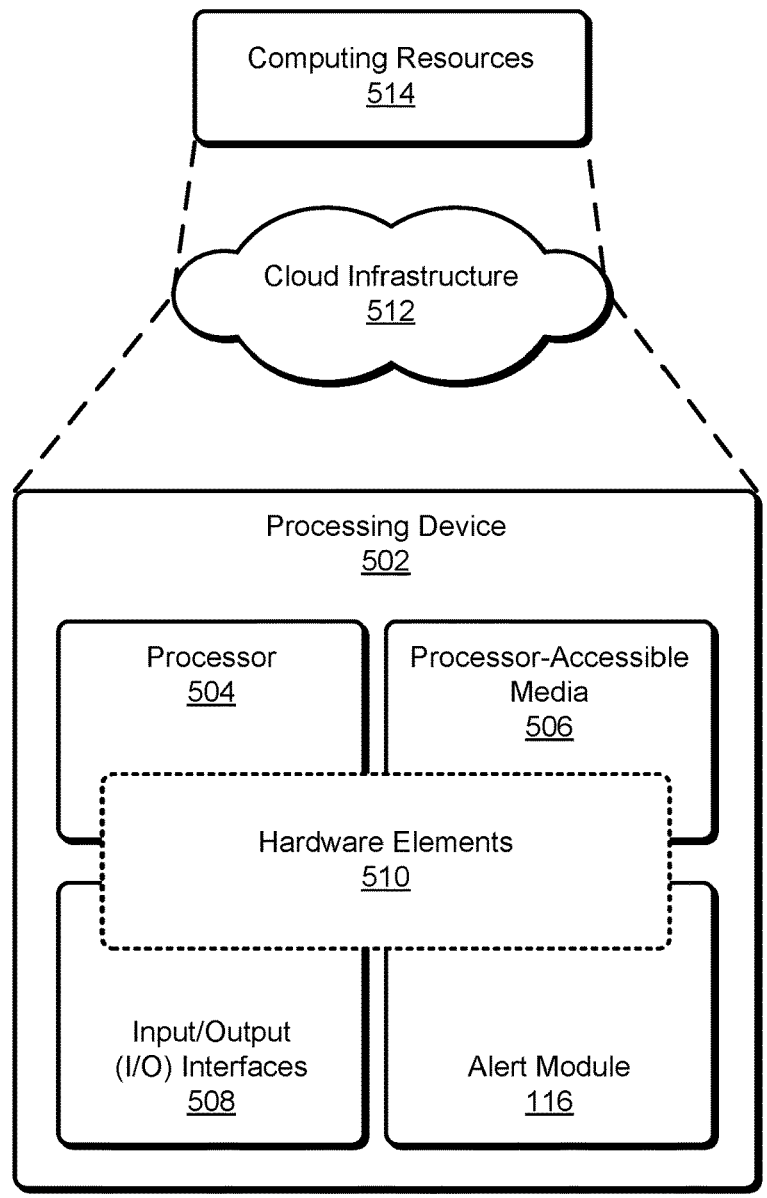
FIG. 5 depicts an example of a processing system to implement a process or system in accordance with one or more example implementations.

FIG. 5 depicts an example of a processing system 500 to implement a process or system in accordance with one or more example implementations. For example, the alert module 116 can be realized using the processing system 500 as shown. Additionally or alternatively, the processing system 500 can be used to implement the example environment 100 of FIG. 1, the process 300 of FIG. 3, the process 400 of FIG. 4, and so forth. As shown, the processing system 500 includes at least one processing device 502, which may be implemented as part of or with support from a cloud infrastructure 512 that provides one or more computing resources 514.

The example processing device 502 as illustrated includes at least one processor 504, one or more processor-accessible media 506, and one or more input/output (I/O) interfaces 508. Components realizing these functionalities are communicatively coupled to each other using a system bus or other data and command transfer fabric. A data and command transfer fabric can be local to a single physical machine or distributed geographically or among many different machines. The processor 504, the processor-accessible media 506, the I/O interfaces 508, and the alert module 116 are representative of components that can provide processing, storage, communication, or analytical functionality or associated operations using hardware. Accordingly, each is illustrated as including one or more hardware elements 510.

The processor 504 can be implemented using one or more processing units that work individually or jointly in a localized or distributed fashion to execute instructions. Examples of processors 504 include a general-purpose processor, an application specific integrated circuit (ASIC), a microprocessor, a digital signal processor (DSP), hard-coded discrete logic, distributed processing resources, or a combination thereof. The processor-accessible media 506 can include memory or distributed storage resources to retain processor-executable instructions for software, modules, firmware, and so forth. Memory may be volatile or nonvolatile memory and may be fixed or removable. Examples of memory include random access memory (RAM), read only memory (ROM), flash memory, optical discs, magnetic disks, magnetoresistive RAM (MRAM), resistive RAM (RRAM), or a combination thereof.

The I/O interfaces 508 may include person-machine interfaces or inter-machine interfaces. Examples of person-machine input interfaces include a microphone, a keyboard, a mouse, a touch-sensitive pad or screen, an accelerometer, a scanner, a camera, or a combination thereof. Examples of person-machine output interfaces include a speaker, a display screen or projector, a haptic device, a printer, or a combination thereof. Examples of inter-machine interfaces include a wireless adapter, a wired adapter, a network card, a port, a switching fabric, or a combination thereof.

Implementations that are described herein may be realized using the hardware elements 510, software, firmware, modules, a combination thereof, and so forth. Modules, for example, may include at least software or firmware that is rendered tangible via execution by the processor 504 or storage by the processor-accessible media 506. Generally, modules may include routines, programs, objects, components, data structures, instructions, combinations thereof, and so forth that perform particular operations upon execution. Modules may be stored on or propagated across the processor-accessible media 506.

The processor-accessible media 506 can include processor-accessible storage media or processor-accessible transmission media. "Processor-accessible storage media," as used herein, refers to media or devices that enable persistent or non-transitory storage of information, which is in contrast to mere signal transmission, carrier waves, or signals per se. Processor-accessible storage media does not include signals per se or signal-bearing media. "Processor-accessible transmission media," as used herein, refers to a signal-bearing medium implemented to transmit instructions or data to the hardware elements 510 of the processing device 502, such as via a network. Processor-accessible transmission media may typically embody instructions, data structures, program modules, etc. in a modulated data signal, such as carrier waves, data signals, or another transport mechanism.

The implementations described herein may be enabled or supported by various configurations of the processing device 502 and are not limited to the specific aspects of the example devices described herein. The processing functionality may also be fully or partially implemented through use of a distributed processing system, such as one realized using cloud infrastructure 512. Thus, the processing device 502 can rely on the cloud infrastructure 512 for computing resources 514, or the processing device 502 can be an integral part of the cloud infrastructure 512.

Cloud infrastructure 512 may be implemented using multiple server devices, using computing functionality offered by at least one data center, some combination thereof, and so forth. The cloud infrastructure 512 provides one or more computing resources 514 by abstracting underlying functionality of hardware (e.g., of one or more servers or a data center) and software computing resources 514 of the cloud infrastructure 512. The computing resources 514 may include applications, data, storage bandwidth, processing cycles, and so forth that can be utilized remotely or using a distributed platform. The computing resources 514 can also be scalable according to demand.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A method for providing recharge warnings, the method comprising:
    determining that a battery of a device requires charging based on a state of charge of the battery;
    communicating a message via a wireless local network to a charger, the message including a request for the charger to generate a first alert indicating that the charger is available to charge the battery of the device;
    receiving an indication via the wireless local network that the charger is available to charge the battery of the device; and
    providing, by the device and in response to the indication, a second alert indicating compatibility between the device and the charger, wherein the second alert corresponds to the first alert and is based on a degree of the compatibility between the device and the charger, wherein the degree of the compatibility comprises a charging rate of the charger.

2. The method as recited in claim 1, further comprising pairing the device and the charger prior to communicating the message;
    wherein the second alert is synchronized with the first alert based on at least one of a color or a rate of flashing of a color light-emitting diode (LED) at the device.

3. The method as recited in claim 1, wherein:
    each of the first alert and the second alert includes an audio signal; and
    the audio signal of the second alert is sounded asynchronously with the audio signal of the first alert.

4. The method as recited in claim 1, wherein:
    the device is capable of pairing with multiple different chargers each having a same connector but different charger specifications; and
    the second alert corresponds to the first alert based on the device having greater charging compatibility with the charger than other chargers of the multiple different chargers.

5. The method as recited in claim 1, further comprising communicating the message via the wireless local network to multiple different chargers that are each compatible with the device and that each use different charger specifications, wherein the second alert corresponds to the first alert to indicate greater charging compatibility between the device and the charger than other chargers of the multiple different chargers.

6. The method as recited in claim 1, wherein the second alert indicates that the battery of the device requires charging.

7. The method as recited in claim 1, wherein the wireless local network comprises one of a wireless local area network (WLAN) or a wireless personal area network (WPAN).

8. The method as recited in claim 1, wherein the device comprises one of a broadcast receiver, a two-way radio, a battery-operated toy, or a remote control.

9. The method as recited in claim 1, wherein the device comprises one of a mobile phone, a handheld gaming device, a portable media player, or a tablet.

10. A battery-powered electronic device, comprising:
    a sensor configured to determine a state of charge of a battery used to power the electronic device;
    a memory; and a microprocessor configured to execute instructions in the memory to implement a communication module configured to:
  determine that the battery requires charging based on the state of charge of the battery;
  wirelessly communicate, via a local network, a request to a charger device, the request requesting that the charger device provide a first alert indicating that the charger device is available to charge the battery;
  receive an indication that the request was received by the charger device; and
  responsive to the indication, generate a second alert indicating that the battery requires charging, the second alert indicating compatibility between the electronic device and the charger device, wherein the second alert corresponds to the first alert and is based on a degree of the compatibility between the electronic device and the charger device, wherein the degree of the compatibility comprises a charging rate of the charger device.

11. The battery-powered electronic device as recited in claim 10, wherein:
  the second alert includes activation of a color light-emitting diode (LED); and
  the second alert is synchronized with the first alert based on one of a color or a flash pattern.

12. The battery-powered electronic device as recited in claim 10, wherein:
  the second alert includes an audible tone; and
  the second alert is sounded in an alternating pattern with a corresponding tone associated with the first alert.

13. The battery-powered electronic device as recited in claim 10, wherein:
  the communication module is further configured to pair the electronic device with multiple different charger devices having different charging specifications but a same connector; and
  the second alert corresponds to the first alert based on greater charging compatibility between the electronic device and the charger device than other charger devices of the multiple different charger devices.

14. The battery-powered electronic device as recited in claim 10, wherein the local network comprises one of a wireless local area network (WLAN) or a wireless personal area network (WPAN).

15. The battery-powered electronic device as recited in claim 10, wherein the electronic device is one of a broadcast receiver, a two-way radio, a battery-operated toy, or a remote control.

16. The battery-powered electronic device as recited in claim 10, wherein the electronic device is one of a mobile phone, a handheld gaming device, a portable media player, or a tablet.

17. A charger device comprising:
  a receiver configured to wirelessly receive, via a local network, a request for charge from an electronic device, the request requesting that the charger device generate an alert indicating that the charger device is available to charge a battery of the electronic device;
  a transmitter configured to wirelessly transmit, via the local network and in response to the request being received, a message indicating that the request was received and that the charger device is available to charge the battery of the electronic device; and
  an alert component configured to generate the alert, the alert corresponding to a counterpart alert generated by the electronic device and being based on a degree of compatibility between the electronic device and the charger device, wherein the degree of the compatibility comprises a charging rate of the charger device.

18. The charger device as recited in claim 17, wherein the alert corresponds to the counterpart alert based on at least one of a matching color or flash pattern of one or more color light-emitting diodes (LED s).

19. The charger device as recited in claim 17, wherein the alert includes an audible tone that is sounded asynchronously with a counterpart tone of the counterpart alert.

20. The charger device as recited in claim 17, wherein the charger device includes one of a wireless charging pad, a charging cradle, a power adapter, or a powerbank.

21. The charger device as recited in claim 17, wherein the local network comprises one of a wireless local area network (WLAN) or a wireless personal area network (WPAN).

22. The charger device as recited in claim 17, wherein the alert is configured to indicate the degree of compatibility of the charger device with the electronic device based on a degree of synchronization of at least one of a color or a rate of flashing between the alert and the counterpart alert.

23. The charger device as recited in claim 17, wherein the alert is provided via activation of a light-emitting diode (LED) representing a non-optimal compatibility between the charger device and the electronic device based on the alert having:
  a first color that is different than a second color corresponding to the counterpart alert; or
  a first rate of flashing that is different than a second rate of flashing corresponding to the counterpart alert.

24. A method for providing recharge warnings, the method comprising:
  wirelessly receiving, via a local network and by a charger device, a message indicating that a battery of the electronic device requires charge;
  determining whether the charger device is available for charging;
  based on a determination that the charger device is available for charging, transmitting a reply message to the electronic device via the local network to indicate that the charger device is available for charging; and
  generating an alert to notify a user that the charger device is available for charging the battery of the electronic device, the alert being generated to correspond to a counterpart alert that is generated by the electronic device and being based on a degree of compatibility between the electronic device and the charger device, wherein the degree of the compatibility comprises a charging rate of the charger device.

25. The method as recited in claim 24, wherein generating the alert includes activating a color light-emitting diode (LED) to match at least one of a color or a flash pattern of a counterpart LED at the electronic device.

26. The method as recited in claim 24, wherein generating the alert includes sounding an audible tone asynchronously with a counterpart tone of the counterpart alert.

27. The method as recited in claim 24, wherein the charger device includes one of a wireless charging pad, a charging cradle, a power adapter, or a powerbank.

28. The method as recited in claim 24, wherein the local network comprises one of a wireless local area network (WLAN) or a wireless personal area network (WPAN).

29. The method as recited in claim 24, wherein the alert is configured to indicate the degree of compatibility of the charger device with the electronic device based on a degree of synchronization of at least one of a color or a rate of flashing between the alert and the counterpart alert.

30. The method as recited in claim 24, wherein generating the alert includes activating a light-emitting diode (LED) to represent a non-optimal compatibility between the charger device and the electronic device by:
    generating a first color that is different than a second color corresponding to the counterpart alert; or
    flashing the LED at a first rate that is different than a second rate of flashing corresponding to the counterpart alert.

\* \* \* \* \*